March 3, 1964  C. E. WHITE  3,123,149
GARDEN TILLER
Original Filed Aug. 26, 1960  3 Sheets-Sheet 1

INVENTOR.
CHARLES E. WHITE
BY
Wheeler, Wheeler & Wheeler
ATTORNEYS.

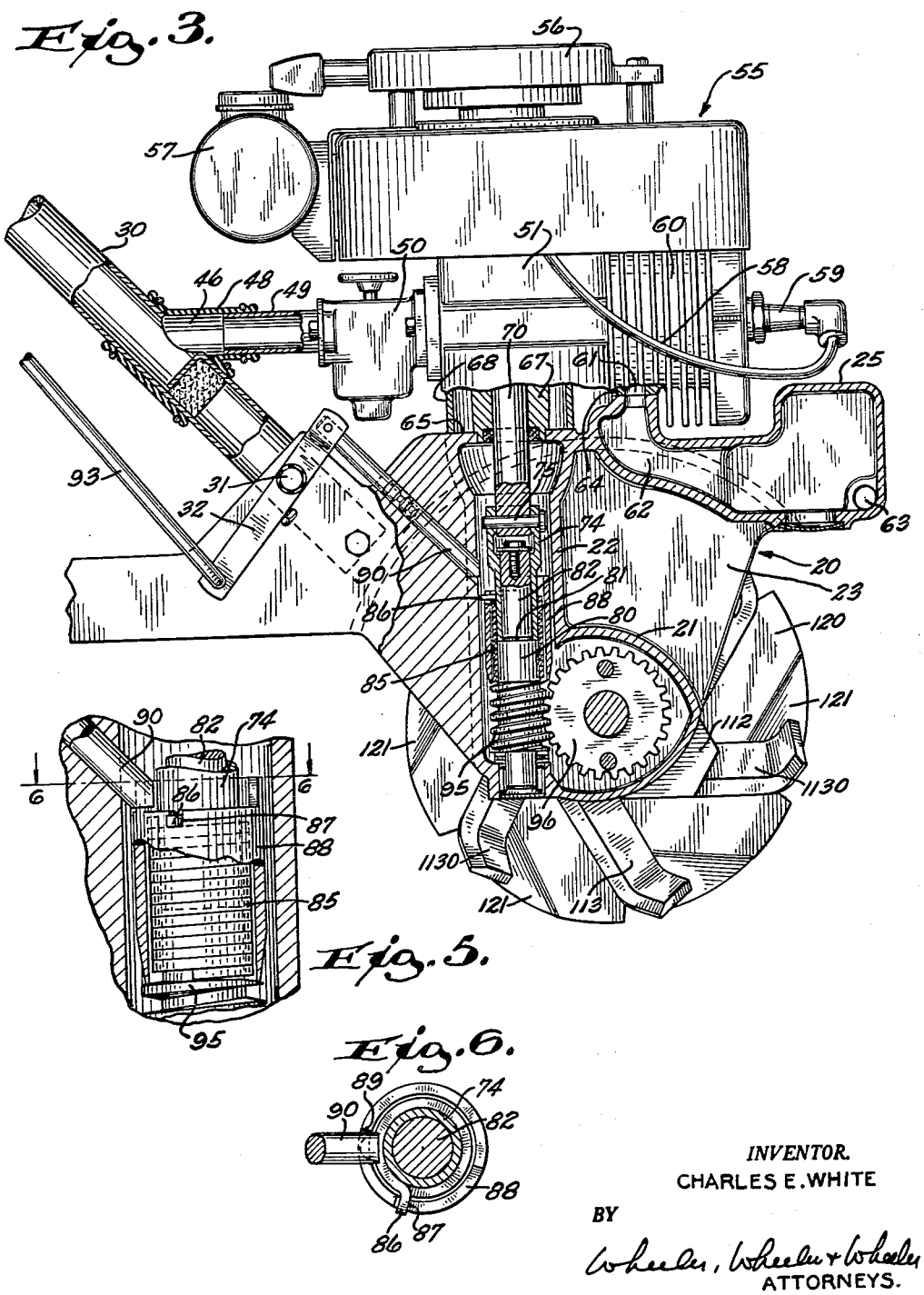

March 3, 1964  C. E. WHITE  3,123,149
GARDEN TILLER
Original Filed Aug. 26, 1960  3 Sheets—Sheet 3
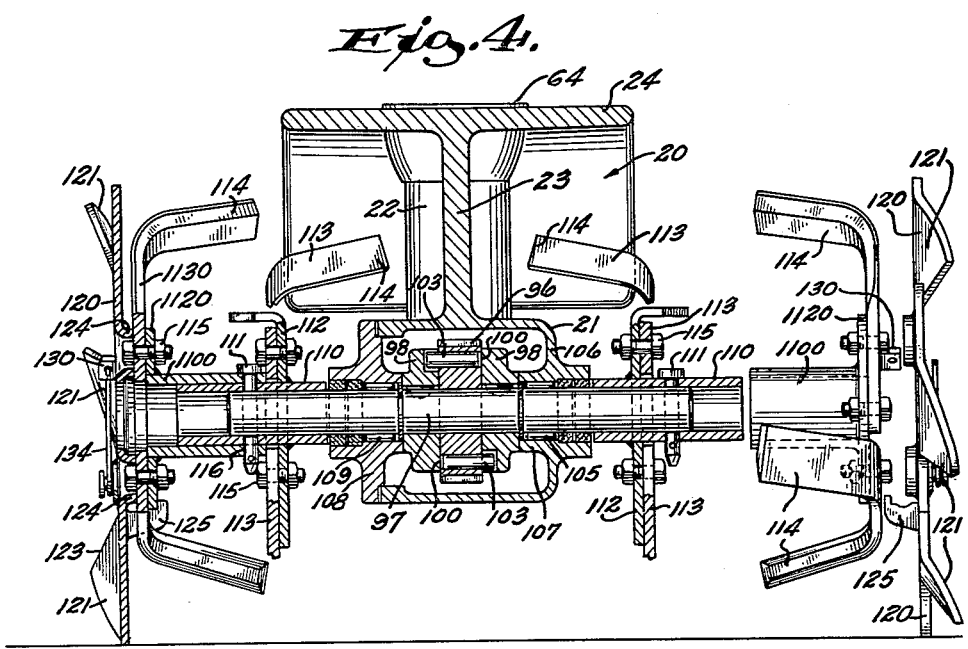
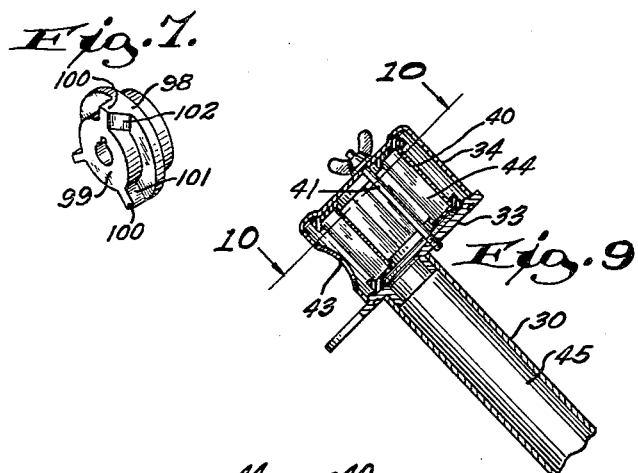
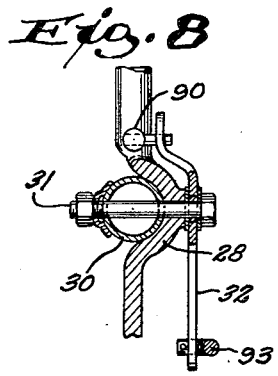
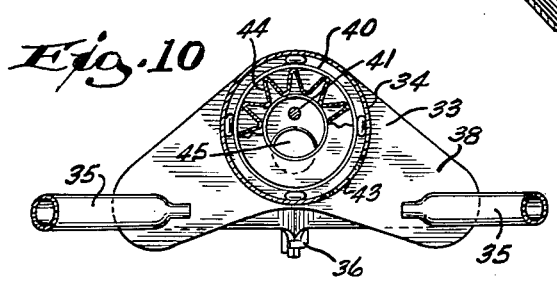
INVENTOR.
CHARLES E. WHITE
BY
Wheeler, Wheeler & Wheeler
ATTORNEYS United States Patent Office 3,123,149
Patented Mar. 3, 1964

3,123,149
GARDEN TILLER
Charles E. White, Sturtevant, Wis., assignor to Outboard Marine Corporation, Waukegan, Ill., a corporation of Delaware
Original application Aug. 26, 1960, Ser. No. 52,139. Divided and this application Sept. 11, 1961, Ser. No. 137,151
5 Claims. (Cl. 172—42)

This invention relates to a garden cultivator. The present application is a division of my application Serial No. 52,139, filed August 26, 1960, and now abandoned.

The above identified parent application is directed to the provision of alternatively usable cultivating tools detachably mounted on a drive shaft or extensions thereof to adjust the width of the swath to four different dimensions. Novel means is provided for facilitating rapid interchange of the various cultivator tools when change in all-over width is desired. An important factor is the arrangement whereby trim disks used at the ends of the assembly in two of the optional assemblies provide substantial continuity of support on a pavement or other hard surface while still contributing to the cultivator action when the device is in use.

The present application is principally concerned with the general organization of the garden cultivator to provide for the guidance thereof on the supporting trim disks above described, and the assembly of the guiding handle, the cultivator shaft, and the engine upon a single casting which serves as a frame and also provides integrally a gear housing, a muffler, a handle connection, and a seat for the power head so designed as to accommodate the drive shaft and also the exhaust gases en route to the muffler.

Still another feature consists in the provision of a handle which also serves as an admission conduit for air en route to the carburetor, the upper end of the handle having an air cleaner carried at a level well above the normal level of dust developed by the cultivator.

In the drawings;

FIG. 3 is a fragmentary view of the cultivator on an enlarged scale taken partially in side elevation and partially in longitudinal section;

FIG. 4 is a detail view in vertical transverse section along the axis of the drive shaft, the power head being omitted;

FIG. 5 is an enlarged detail view in section showing driving clutch with its control illustrated in a declutching position, portions of the clutch sleeve being broken away;

FIG. 6 is a view taken in section on the line 6—6 of FIG. 5;

FIG. 7 is a detail view in perspective of one of a pair of over running clutch members used on the axle to receive motion from the driving gear, as shown in FIG. 4;

FIG. 8 is a fragmentary detail view taken on an enlarged scale in section on the line 8—8 of FIG. 1;

FIG. 9 is a fragmentary detail view taken in vertical section axially of the handle at the upper end thereof;

FIG. 10 is a view taken in section on the line 10—10 of FIG. 9.

Figure 1:
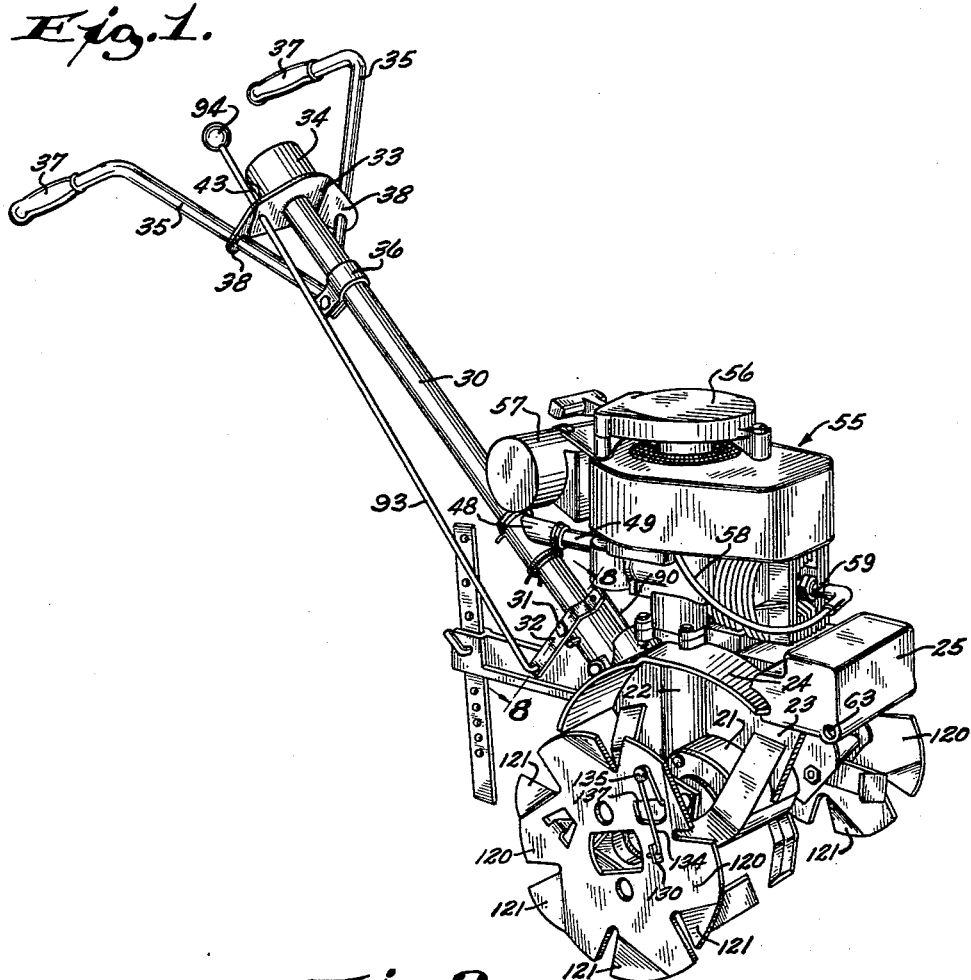
FIG. 1 is a view in perspective of a cultivator embodying the invention.

The frame casting 20 upon which the parts of my garden tractor are assembled comprises integrally a gear housing 21 connected by shaft housing 22 and webs 23 with fenders 24. The casting integrally includes at its forward end a muffler 25.

Extending rearwardly from the fender is a coupling arm 26 to which implements may be detachably connected by means of the ears 27. A semi annular channel 28 receives a tubular handle 30 connected thereto by bolt 31 upon which a control lever 32 is pivoted as shown in FIGS. 1, 3 and 8.

The tubular handle 30 has plate 33 welded to its upper end to provide a base for an air cleaner housing 34. The plate 33 also positions the handle extensions 35 which comprise rods held by clamp 36 to handle 30 and have grip members 37 at their outer ends. The handle extensions 35 extend through, and are positioned by, downwardly bent ears 38 at the ends of the mounting plate 33.

The air cleaner 40 within housing 34 is readily removable by unscrewing the bolt 41 which holds the housing 34 to plate 33. The housing has an air admission port at 43 through which air enters externally of filter element 44. The air so admitted passes through the filter element 44 to the center of the air cleaner, which communicates with the passage 45 in the interior of the tubular handle 30.

Near the lower end of handle 30 there is a lateral port 46. The ported portion of the handle is embraced by a branch pipe 48 into which the carburetor inlet tube 49 is sleeved. Air admitted through tube 49 passes the carburetor 50 to enter the engine 51 which is a part of the power head generically designated by reference character 55. As is usual in such devices, the engine may have a recoil starter 56. The power head includes a fuel tank 57 and has ignition means including cable 58 leading to spark plug 59.

From the engine cylinder 60, an exhaust port 61 leads into a passage 62 cored in the base casting 20 and leading into the integral muffler 25. The muffler outlet is shown at 63.

Figure 2:
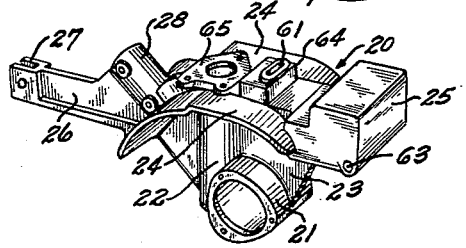
FIG. 2 is a view in perspective on a reduced scale showing the base frame unit upon which the other parts are assembled.

As best shown in FIG. 2 the base casting 20 has seat portions at 64 and 65 upon which the power head is mounted. The base casting seat portion 64 engages and supports the cylinder 60 about the exhaust port 61. The seat portion 65 of the base casting engages and supports the drive shaft bearing sleeve 67 and an enclosing tube 68 as best shown in FIG. 3.

The drive shaft 70 projects from its bearing sleeve in a position to enter the shaft housing 22 when the power head is assembled upon the seats 64 and 65 as shown. The shaft housing is a part of the base frame 20 and communicates with gear housing 21, also part of base frame 20, as best shown in FIG. 3.

Connected to the drive shaft 70 within the tubular housing 22 is clutch sleeve 74, the upper end of which receives motion through pin 75 from the engine crank shaft 76. The driven shaft 80 has a shoulder at 81 abutted by the end of clutch sleeve 74. Above the shoulder the reduced end portion 82 of the driven shaft is piloted within the clutch sleeve. The clutch sleeve is externally the same diameter as the driven shaft 80, the joint being spanned by a contractile clutch spring 85 which transmits motion from the driving clutch sleeve 74 to the driven shaft 80.

The spring 85 may be expanded to interrupt motion by obstructing free rotative movement of its offset upper end portion 86. The laterally projecting spring end 86 is engaged in a notch 87 of control sleeve 88 which encircles the spring. Above the end of the spring the control sleeve is shouldered at 89, the shoulder being located in a position such that the clutch control pin 90 will lie in the path of the movement of the shoulder when the pin is advanced by means of control lever 32 from the retracted position shown in FIG. 3 to the advanced position in which the pin is illustrated in FIGS. 5 and 6. When the pin is in the path of the sleeve and the sleeve is thus prevented from rotation, the upper end of the spring is expanded to relieve it from frictional driven connection with the driving sleeve 74 of the clutch assembly. Thus, with the control pin 90 in its advanced position, no motion will be communicated from engine drive shaft 70 to the clutch. With the pin retracted to the position of FIG. 3 driving motion is transmitted from the engine shaft 70 through the spring to the axle drive shaft 80.

To operate the control pin 90, a link 93 extends from the lever 32 through the mounting plate 33 at the upper end of handle 30 and carries handle knob 94 conveniently accessible to the operator. Pushing down on the knob permits the clutch to engage. Pulling upwardly on the knob advances the pin 90 into the path of control sleeve 88 thereby expanding the upper end of the clutch spring to disengage the clutch.

Fixed to the axle drive shaft 80 is a gear 95 which meshes with, and drives, a gear 96 which is rotatable on the axle shaft 97 except as connected thereto through an overrunning clutch.

The gear 96 is confined between driven elements 98 having hub portions 99 keyed to axle shaft 97. Each of the abutments 100 projecting from the hub 99 at angularly spaced points has a shoulder 101 on that side which is rearwardly directed. Pins 103 are slidable transversely through bores provided in the driving gear 96, each being long enough to engage only one driven element at a time. During normal forward propulsion, the projecting end of each pin will engage the shoulder 101 of an abutment 100 to transmit driving motion to the axle. However, if the operator wants to advance the implement manually, the beveled surfaces 102 of the respective staggered abutments of the respective driven elements 98 will alternately engage the ends of pins 103 of the driving gear to reciprocate the pins back and forth. The device functions as an over-running clutch under these circumstances. This type of over-running clutch is well known, and no claim is made to the clutch per se.

The axle shaft 97 is provided with bearings at 105 in the relatively closed end wall 106 of the gear housing 21, such wall providing a bearing race at 107. At the other end of housing 21 a removable closure 108 provides a race for the bearings 109 for shaft 97.

Cultivating implements are mounted on the projecting ends of shaft 97. The basic cultivating tool best shown in FIG. 4 comprises a tubular hub 110 detachably fastened to the shaft 97 by means of a removable cross pin 111. Welded to the hub is a polygonal plate 112. To this plate are bolted the detachable tines 113 each of which has its end portion 114 extending inwardly to operate beneath the fender flange 24. Bolts 115 releasably anchor the tines. When the implement is to be operated to cultivate its narrowest swath, no other cultivator tools will be used.

However, the implement completely assembled for cultivating a maximum swath includes, at each end of shaft 97, additional cultivating equipment as follows.

The plate 1120 is identical with plate 112 except that it is welded to hub 1100 which is slightly larger in diameter than the hub 110 and is telescopically sleeved onto the hub 110 to be anchored by the aforesaid pin 111 as shown at the left in FIG. 4. The tines 1130 are identical with tines 113 but the orientation of the plate 1120 is desirably such that the tines 1130 are angularly offset to project intermediate the tines 113. The diametrically opposite apertures 116 in the hub 1110 which receive pin 111 are so located that the desired angular relationship of the mounting plate 1120 and the cultivator tines 1130 is automatically achieved when the extension hub 1110 is coupled to the hub 110 of the basic cultivator tool. Tines 1130 are secured to plate 1120 by bolts 115 in the same manner as above described. They are readily detachable in the event of breakage.

Arranged to be mounted optionally on either of the cultivator tools is a trim plate 120 which has generally triangular portions 121 of its periphery severed by radial notches 122, the portions 121 being thereupon bent outwardly from the plane of the plate. The margins 123 of the outwardly bent generally triangular portions 121 of the trim plate 120 serve to shear and smooth off the edges of the cultivated swath made by the implement. At the same time, the deflection of these outwardly deformed marginal portions 121 is not so great as to preclude the periphery of the trim plate 120 from acting as a nearly continuous wheel upon which the implement will roll quite smoothly on a hard surface such as concrete.

The trim plate is detachably mounted on either of the tined tools. To this end, the plate 120 is provided at diametrically opposite points with inwardly bossed tubular flanges 124 which engage about the heads of two of the tine mounting bolts 115 in the manner shown in FIGS. 4 and 9 and 11. A hook 125 formed inwardly from the material of plate 120 engages the mounting plate 112 (or 1120, as the case may be), as best shown in FIG. 4.

With the trim plate thus hooked to the mounting plate and positioned by engagement of its tubular flanges 124 upon the heads of nuts 115, a tab 130 projecting from an upstanding flange 131 on the mounting plate will enter a hole 132 in the trim plate where it can be anchored detachably by a spring key 133.

Unless extremely narrower width is desired it is preferred to have the trim plates applied to either the inner of basic tined tools or to the outer or supplemental tined tools. The trim plates cooperate with the tined tools by confining the earth upon which the tined tools operate, therefore holding lumps of earth within range of the tines and neatly defining the edges of the swath. Moreover, as noted above, the peripheries of the trim plates provide rolling support upon which the entire implement moves reasonably smoothly on hard surfaces and without the jerkiness inherent in the provision of support only through the angularly spaced tines. However, when both sets of tined tools are in use, there is relatively little jerkiness even without the trim plates because of the cooperative supporting action which follows from the fact that the inwardly bent ends of the tines are uniformly spaced and the angular interval between them is very much less when both tined tools are mounted than is the case when only the basic tool is mounted.

I claim:

1. In a cultivator implement, a base casting integrally providing a gear housing, a shaft housing tangential thereto, a transverse implement shaft having bearings in the gear housing, implement means thereon, an upright drive shaft having bearings in the shaft housing, gearing connecting said shafts, an engine having a crank shaft and having a cylinder provided with an exhaust port, means for drivingly connecting the crank shaft with the said drive shaft, means for providing a power head seat on the base casting and on which the engine is mounted, the base casting having a passageway opening through said seat and with which the cylinder exhaust port registers, and a muffler mounted on the base housing and with which the said passage communicates.

2. An implement according to claim 1 in which the cylinder is substantially horizontal and the crank shaft substantially upright and aligned with the drive shaft, and contractile spring clutch means constitutes the means for connecting the crank shaft and drive shaft.

3. The device of claim 1 in which said casting further includes integral fender flanges generally concentric with said gear housing, said gear housing being generally cylindrical and transversely elongated.

4. The device of claim 1 in which a handle is connected with the base casting for the guidance of said implement, and said engine has means for carbureting air, and an air supply connection to said air carbureting means from said handle, said handle having a passage extending longitudinally thereof to the said connection, said passage having an elevated inlet adjacent the end of the handle remote from the base casting.

5. The device of claim 5 in which the handle comprises a tube having manually operable extensions provided with grips, the handle tube being provided with a mounting plate having means for fixing the positions of said extensions, and an air cleaner mounted on said plate and connected with the handle passage.

References Cited in the file of this patent

UNITED STATES PATENTS

| | | |
|---|---|---|
| 1,578,343 | Mould | Mar. 30, 1926 |
| 2,298,970 | Russel et al. | Oct. 13, 1942 |
| 2,475,432 | Marihart | July 5, 1949 |
| 2,597,774 | Britten | May 20, 1952 |
| 2,816,495 | Brooks | Dec. 17, 1957 |
| 2,893,497 | Vellenzer | July 7, 1959 |

UNITED STATES PATENT OFFICE
CERTIFICATE OF CORRECTION

Patent No. 3,123,149                                     March 3, 1964

Charles E. White

It is hereby certified that error appears in the above numbered patent requiring correction and that the said Letters Patent should read as corrected below.

Column 1, line 20, for "all-over" read -- over-all --; column 4, line 56, for "passageway" read -- passage --; column 5, line 3, for the claim reference numeral "5" read -- 4 --.

Signed and sealed this 7th day of July 1964.

(SEAL)
Attest:

ERNEST W. SWIDER
Attesting Officer

EDWARD J. BRENNER
Commissioner of Patents